United States Patent [19]

Shahamat et al.

[11] Patent Number: 5,602,437
[45] Date of Patent: Feb. 11, 1997

[54] BEARING FAILURE DETECTOR FOR ELECTRIC GENERATOR

[75] Inventors: Mohammad Shahamat, Stow; Stephen F. Brucker, Aurora, both of Ohio

[73] Assignee: Lucas Aerospace Power Equipment Corporation, Aurora, Ohio

[21] Appl. No.: 281,241

[22] Filed: Jul. 27, 1994

[51] Int. Cl.⁶ .......................... H02K 7/08; H02K 11/00; G08B 21/00
[52] U.S. Cl. .................. 310/90; 310/68 R; 340/682
[58] Field of Search .................... 310/90, 68 R; 384/448, 625; 340/682

[56] References Cited

U.S. PATENT DOCUMENTS

| | | | |
|---|---|---|---|
| 1,001,152 | 8/1911 | Lawrence | 340/682 |
| 3,108,264 | 10/1963 | Heinoo | 340/682 |
| 3,176,286 | 3/1965 | Dschen | 340/682 |
| 3,508,241 | 4/1970 | Potter | 340/682 |
| 3,775,680 | 11/1973 | Egeland | 340/682 |
| 4,063,786 | 12/1977 | Rall | 340/682 |
| 4,074,575 | 2/1978 | Bergman et al. | 340/682 |
| 4,584,865 | 4/1986 | Hutchins | 340/682 |
| 4,641,978 | 2/1987 | Kapich | 384/102 |
| 5,140,311 | 8/1992 | Cook | 340/682 |
| 5,198,763 | 3/1993 | Konishi | 384/448 |
| 5,244,287 | 9/1993 | Yoshikawa | 384/448 |

FOREIGN PATENT DOCUMENTS

| | | | |
|---|---|---|---|
| 3-4018 | 1/1991 | Japan | 384/448 |
| 727886 | 4/1980 | U.S.S.R. | 340/682 |
| 1307115 | 4/1987 | U.S.S.R. | 384/448 |
| 1580064 | 7/1990 | U.S.S.R. | 384/448 |
| 441837 | 10/1934 | United Kingdom | 340/682 |
| 1153413 | 5/1969 | United Kingdom . | |
| 1207348 | 9/1970 | United Kingdom . | |
| 1277245 | 6/1972 | United Kingdom . | |
| 1501691 | 2/1978 | United Kingdom . | |
| 1572281 | 7/1980 | United Kingdom . | |

*Primary Examiner*—Clayton E. LaBalle
*Attorney, Agent, or Firm*—Rankin, Hill, Lewis & Clark

[57] ABSTRACT

A bearing failure detector for an electrical generator includes a disc located within the bearing assembly near the location of the main bearings. The disc includes an electrically conductive ring encased in an insulation layer. The ring is exposed along inside diameter of the detector disc adjacent to the periphery of the shaft, but the dimensions of the inside diameter of the ring are slightly greater than the normal internal clearance of the main bearings, so that the shaft does not contact the ring unless the bearings are significantly worn. The detector ring is connected to a resistor with a large resistance which is monitored by a control circuit at all times. When the internal clearance of the main bearings has been enlarged by a predetermined amount, the ring contacts the shaft, changing the resistance monitored by the control circuit. This causes the control circuit to provide an indication that the bearings need replacement. The detector eliminates the need for preventive replacement of bearings at scheduled maintenance periods when the bearings may not actually need replacement because they are not sufficiently worn, saving service time and costs. Auxiliary bearings are provided to support the shaft when the shaft has contacted the detector, providing safe operation of the generator for a sufficient period of time after a bearing replacement indication has been provided until the bearing assembly is replaced.

5 Claims, 2 Drawing Sheets

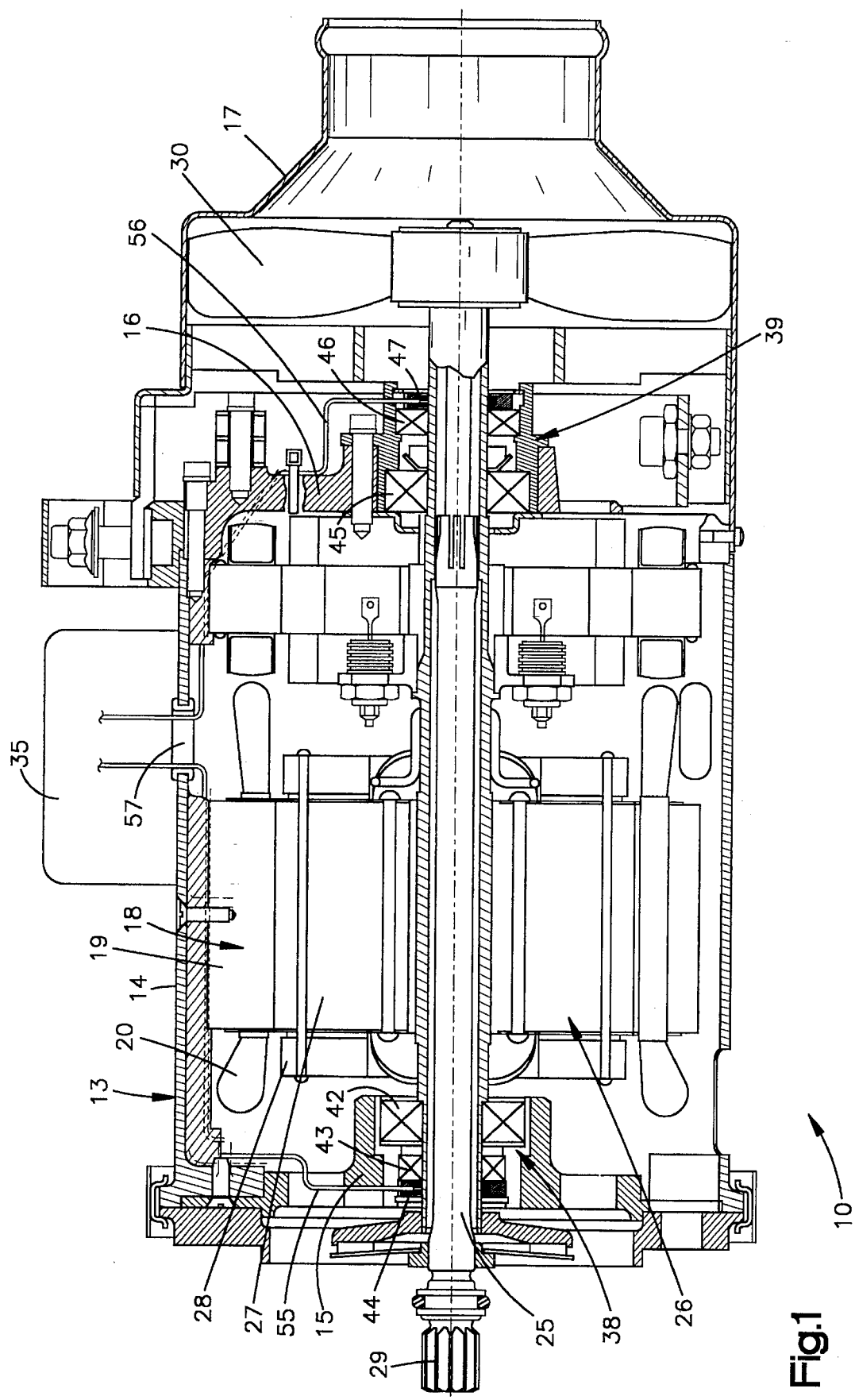

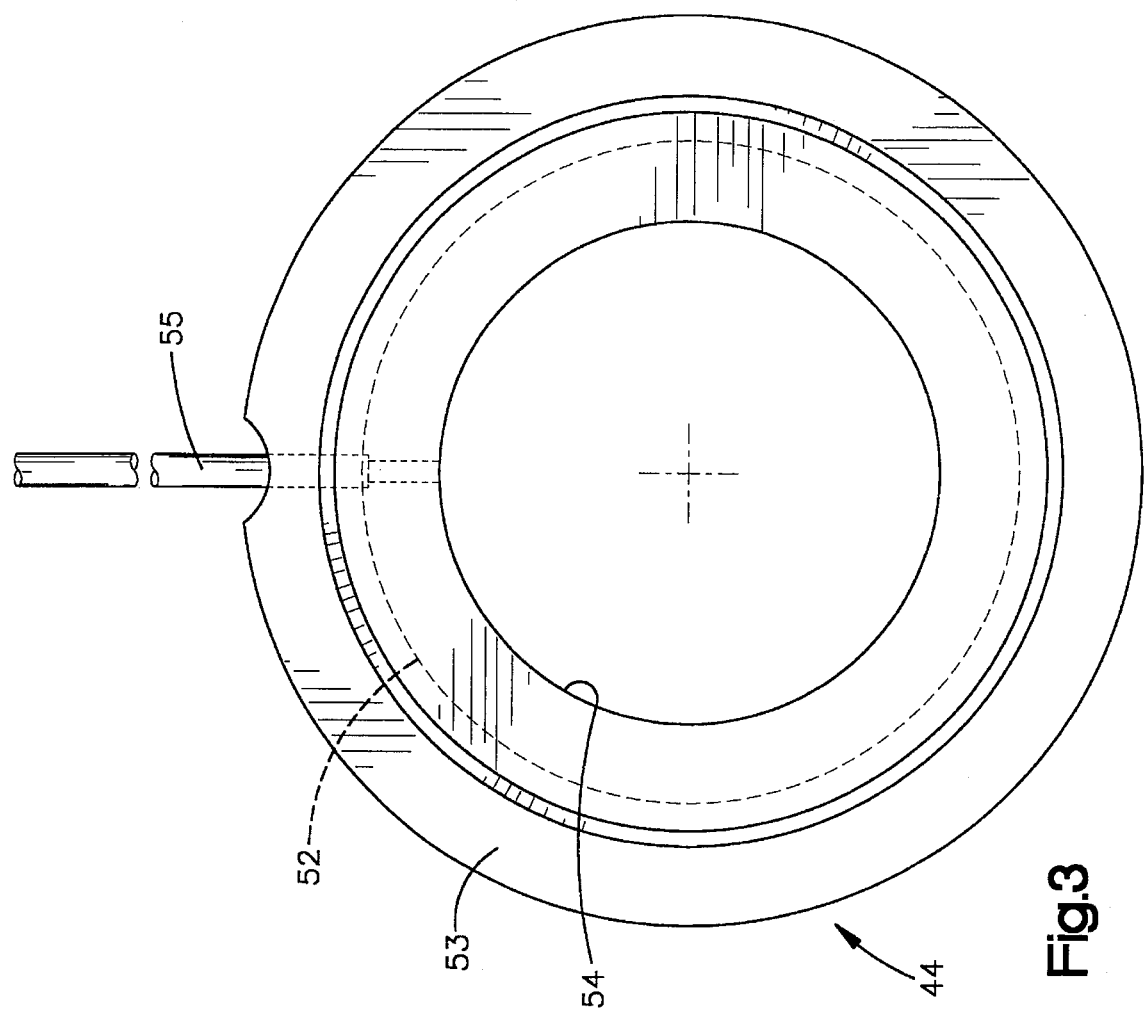
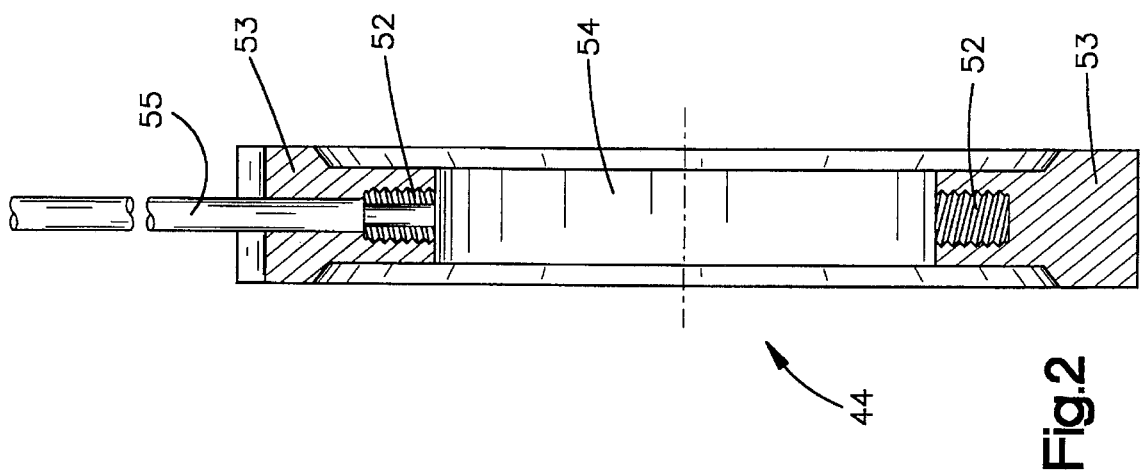

BEARING FAILURE DETECTOR FOR ELECTRIC GENERATOR

BACKGROUND OF THE INVENTION

1. Field of the Invention

This invention relates to electrical generators, and more particularly to generators having bearings for supporting the drive shaft and to a system for detecting the imminent failure of such bearings and the need for bearing replacement.

2. Description of the Prior Art

In electrical generators, such as those used to power the electrical systems of aircraft, the generator is connected to the main engine by a drive shaft. The rotor assembly is mounted on the shaft and rotates within the stator assembly. The shaft is supported for rotation in the generator housing using sealed bearing assemblies comprising grease lubricated ball bearings. In the course of normal generator operation, the bearings are subject to wear. Eventually, the bearings can wear sufficiently that bearing failure can occur, causing the generator to stop functioning. If the generator stops functioning, the aircraft electrical system may not operate.

In order to prevent bearing failure and to maintain proper operation of the generator, the bearings are usually replaced at predetermined service intervals. The bearing replacement intervals are determined based upon worst-case scenarios of bearing wear, and the bearings are scheduled for replacement before any reasonable possibility of bearing failure can occur. As a result, the bearings are usually replaced long before they are actually worn out, and generators are disassembled and serviced unnecessarily before there is any immediate need for bearing replacement. This results in unnecessary servicing, cost and equipment downtime.

In any event, this unnecessary servicing has still been preformed because there has been no means by which one could determine whether or not the bearings were close to actual failure, and preventive maintenance needed to be preformed because of damage to the generator, and possible loss of electrical power that would result if the bearings actually failed.

SUMMARY OF THE INVENTION

The present invention provides an on-board means for determining whether bearing failure is about to occur in aircraft generators so that proper bearing replacement can be undertaken when necessary. Using the present invention, the bearings need be replaced only when necessary to prevent actual bearing failure. The invention determines that bearing failure is about to occur and provides an indication that the bearings need to be replaced. The invention also provides for safe operation of the generator for a sufficient period of time after a bearing replacement indication has been provided.

The bearing failure detector of the present invention is designed to eliminate the need for automatic scheduled replacement of bearings according to a maintenance schedule that may not reflect the need for actual bearing replacement. The bearing failure detector will thus allow the bearings to operate until they are close to failure, at which time the detector provides an indication that the bearings are about to fail and must be replaced within a certain number of hours of operation. This indication may be in the form of a signal to the cockpit to inform the pilot of the need for bearing replacement.

After the bearing replacement indication is provided, the present invention uses auxiliary bearings upon which the shaft rides until the bearing assemblies are replaced. The auxiliary bearings have slight gap between their inside diameter and the rotor shaft and are only used when the main bearings have worn to the point that their internal clearances have sufficiently enlarged to equal this gap.

The bearing failure detector of the present invention includes a disc located within the bearing liner next to the auxiliary bearings and near the location of the main bearings. The bearing failure detector disc includes an electrically conductive ring encased in an insulation layer to electrically insulate it from the generator frame. The ring is exposed along inside diameter of the detector disc, but the dimensions of the inside diameter are greater than the normal internal clearance of the main bearings, so that the shaft does not contact the ring unless and until the bearings are significantly worn. The detector ring is connected to a resistor with a large resistance which is being monitored by a control circuit at all times.

During operation, as the main bearings are approaching failure, the main generator shaft will move within the increased internal clearance of the bearings. Eventually, the shaft will rub against the detector disc, and the electrical resistance across the disc, which is monitored by the control circuit, will approach zero. The control circuit will sense this decrease in resistance as a change in potential or current, and will send the appropriate signal to the cockpit. At this time, the generator shaft will be supported by auxiliary bearings, and any further deterioration of the main bearings will be prevented.

Thus, generator bearings need be replaced only when they are close to failure in accordance with the present invention, and unnecessary scheduled routine maintenance of the generator is avoided. Furthermore, the generator can operate safely after the bearing replacement indication has been provided through the use of the auxiliary bearings.

These and other advantages are provided by the present invention of an electrical generator which comprises a housing assembly, and a stator assembly which is fixedly mounted with respect to the housing assembly. A bearing assembly is supported by housing assembly, and the bearing assembly includes main bearings having an internal clearance. A shaft is supported for rotation in the bearing assembly and extends through the housing assembly. A rotor assembly is mounted on the shaft for rotation therewith inside the stator assembly. A bearing failure detector is mounted adjacent to the bearing assembly. The detector senses an enlargement in the internal clearance of the main bearings by a predetermined amount, which enlargement indicates the need for replacement of the bearings.

BRIEF DESCRIPTION OF THE DRAWINGS

FIG. 1 is a side sectional view of a generator having the bearing failure detector of the present invention.

FIG. 2 is a side sectional view of one of the bearing failure detectors of FIG. 1 to a larger scale.

FIG. 3 is a end elevational view of the bearing failure detector of FIG. 2.

DETAILED DESCRIPTION OF THE PREFERRED EMBODIMENT

Referring more particularly to the drawings and initially to FIG. 1, there is shown a generator 10 incorporating the present invention. The generator 10 is an AC generator of the type generally used in many aircraft. The housing, stators and rotors of the generator 10 are essentially the same as those in a Model 30086-010 generator available from Lucas Aerospace Power Equipment Corporation, of Aurora, Ohio. For the purpose only of convenience in describing the generator 10, the left end of the generator as shown in FIG. 1 will be referred to as the front end, and the right end of the generator as shown in FIG. 1 will be referred to as the rear end.

The generator 10 includes a housing assembly 13 comprising an outer cylindrical housing member 14, a front end cover assembly 15 attached to one end of the housing member 14, a rear end hub 16 attached to the other end of the housing member 14, and a fan cover 17 extending from the rear of the generator beyond the rear end hub 16. A stator assembly 18 is mounted to the inside of the cylindrical housing member 14. The stator assembly 18 comprises a stator core 19 and stator windings 20.

The generator is driven by a rotatable shaft 25 which extends through the housing assembly 13. The rotor shaft 25 has a spline 29 at the front end for attachment to the main drive of the aircraft motor. At the rear end of the shaft 25 a fan 30 is mounted for cooling the generator. The fan 30 is enclosed by the fan cover 17. A rotor assembly 26 is mounted on the shaft 25 for rotation therewith. The rotor assembly 26 comprises a rotor core 27 and rotor windings 28.

Except as described below, most of the other elements of the generator 10 are known and need not be described herein in further detail, since they are not important to the function of the present invention.

A generator control unit 35 may be provided for controlling the operations of the generator 10. The function and design of the generator control unit 35 are described in more detail in copending U.S. patent application Ser. No. 08/131, 196, which is assigned to the assignee of the present invention, and the disclosure of which is hereby incorporated by reference in its entirety.

The shaft 25 is held in place within the housing assembly 13 by a pair of bearing assemblies 38 and 39. The front bearing assembly 38 is contained within a portion of the front end cover assembly 15. The rear bearing assembly 39 is contained within a portion of the rear end hub 16.

The front bearing assembly 38 comprises main bearings 42, auxiliary bearings 43 located next to the main bearings 42, and a bearing failure detector 44. The rear bearing assembly 39 comprises main bearings 45, auxiliary bearings 46 located next to the main bearings 45, and a bearing failure detector 47. The auxiliary bearings 43 and 46 have a slight annular gap between their inside diameter and the rotor shaft 25, so that the auxiliary bearings 43 and 46 will not normally contact the shaft 25 while the shaft is properly centered in the main bearings and the main bearings are not excessively worn. The auxiliary bearings 43 and 46 will only contact the shaft 25 when the main bearings 42 and 45 have worn beyond a predetermined limit and are close to failure as will be described more fully later.

Both of the bearing failure detectors 44 and 47 are essentially the same and both will be described with reference to the bearing failure detector 44 shown in FIGS. 2 and 3. As shown particularly in FIG. 2, the bearing failure detector 44 is essentially a disc comprising a conductive ring 52, preferably of a highly conductive metal such as copper. The ring 52 is encased in an insulating layer 53. Preferably, a suitable insulating plastic material is molded around the ring 52 to form the layer 53. The plastic material of the layer 53 may be any suitable material, such as glass fiber reinforced polyetheretherketone. The layer 53 electrically insulates the ring 52 from the other elements of the generator. After the layer 53 of insulating material has been molded around the ring 52, a central opening 54 is formed in the middle of the detector 44. The central opening 54 is machined so that the inside diameter the metal ring 52 is exposed through the layer 53 around the periphery of the central opening. The inside diameter of central opening 54 of the detector 44 is slightly greater than the outside diameter of the shaft 25, so that when the shaft is properly centered in the main bearings 42, the shaft will not touch the metal ring 52. The inside diameter of the central opening 54 is also approximately the same as the inside diameter of the auxiliary bearings 43, so that the shaft 25 can be supported by the auxiliary bearings if it is capable of touching the detector 44. A lead wire 55 is connected to the metal ring 52 by suitable means, such as by brazing.

As shown in FIG. 1, the lead wire 55 from the bearing failure detector 44 as well as the corresponding lead wire 56 from the other bearing failure detector 47 extend through an opening 57 in the cylindrical housing member 14 to the generator control unit 35, along with other wires (not shown) from the operative generator components, such as the main stator and the exciter stator assemblies.

In operation, with the main bearings 42 and 45 functioning and properly supporting the rotor shaft 25, the shaft rotates concentrically within the auxiliary bearings 43 and 46 forming a slight gap therebetween, and the shaft rotates concentrically within the central openings in the detectors 44 and 47. Since the inside diameter of the auxiliary bearings 43 and 46 is slightly greater than that of the main bearings 42 and 45, only the main bearings support the shaft 25, and the shaft does not contact the auxiliary bearings. Likewise, since the inside diameter of the central opening 54 in the detectors 44 and 47 is slightly greater than the inside diameter of the main bearings 42 and 45, the shaft 25 does not touch the detectors.

When the main bearings 42 and 45 have worn significantly, the internal clearance of the main bearings increases. This allows the shaft 25 to contact the bearing failure detectors 44 and 47. When the shaft 25 contacts the metal ring 52 of one of the detectors 44 and 47, the resistance across the ring decreases significantly, approaching a resistance of zero. Since the ring 52 is connected to the generator control unit 35 by the lead wires 55 and 56, the unit 35 monitors this sharp decrease in resistance, and thus detects that the main bearings 42 and 45 have worn to the point that the shaft 25 can contact the detectors 44 and 47. This indicates that it is time to replace the main bearings 42 and 45. The decreased resistance sensed by the generator control unit 35 may be used to send a signal to the cockpit to advise the pilot that the main bearings 42 and 45 must be replaced within a predetermined period of time, such as 20 hours of operation. The generator 10 can continue to operate on the auxiliary bearings 43 and 46, until the main bearings 42 and 45 are replaced.

The bearing failure detectors 44 and 47 thus allow operation of the generator 10 until the bearing assemblies are near failure and avoid the necessity for periodic scheduled bearing replacement which may be otherwise unnecessary. The detectors 44 and 47 and the auxiliary bearings 43 and 46 also allow the generator to operate safely for a sufficient period of time after a replacement indication has been provided by the detectors to allow replacement of the bearing assembly.

Although the structure and operation of the present invention has been described with reference to a generator control unit such as that described fully in copending U.S. patent application Ser. No. 08/131,196, it should be understood that such a generator control unit is not necessary for the operation of this invention, and the use of the generator control unit is included in the description in order to illustrate a preferred form of the invention and to show another of the advantages of the generator control unit disclosed U.S. application Ser. No. 08/131,196. The invention can also operate using any suitable circuit which measures resistance, current or electrical potential and thereby senses that the detector disc has contacted the shaft, and which then provides a suitable warning signal as a result of such measurement.

Other variations and modifications of the specific embodiments herein shown and described will be apparent to those skilled in the art, all within the intended spirit and scope of the invention. While the invention has been shown and described with respect to particular embodiments thereof, these are for the purpose of illustration rather than limitation. Accordingly, the patent is not to be limited in scope and effect to the specific embodiments herein shown and described nor in any other way that is is inconsistent with the extent to which the progress in the art has been advanced by the invention.

What is claimed is:

1. An electrical generator which comprises:

a housing assembly;

a stator assembly fixedly mounted with respect to the housing assembly;

a bearing assembly supported by housing assembly, the bearing assembly including main bearings having an internal clearance;

a shaft supported for rotation in the bearing assembly and extending through the housing assembly;

a rotor assembly mounted on the shaft for rotation therewith inside the stator assembly; and a bearing failure detector comprising a ring of an electrically conductive material which encircles the shaft and having a central opening through which the shaft extends, the ring directly contacting the shaft when the internal clearance of the main bearings has been enlarged by a predetermined amount, which enlargement indicates the need for replacement of the bearings, a lead permanently affixed to the ring at a connection point for connecting the detector to a control circuit to electrically sense contact of the ring by the shaft, and a layer of electrically insulating material coating the ring to insulate the ring from components of the generator other than the shaft, the coating layer of electrically insulating material completely encasing the ring and the connection point except along the central opening where the ring is capable of directly contacting the shaft to expose the electrically conductive material around the entire periphery of the central opening.

2. An electrical generator as recited in claim 1, wherein the lead connects the detector to a control circuit to electrically sense contact of the ring by the shaft by an decrease in resistance.

3. An electrical generator as recited in claim 1, wherein the shaft has an outside diameter, and wherein the bearing assembly also includes auxiliary bearings which have an inside diameter which is larger than the outside diameter of the shaft.

4. A bearing failure detector for mounting on a shaft, which comprises:

a ring of an electrically conductive material having a central opening with an inside diameter which is slightly greater than the outside diameter of the shaft;

a layer of an electrically insulating material coating the ring, the coating layer molded to the ring and surrounding the ring except along the inside diameter of the ring to expose the electrically conductive material around the entire periphery of the central opening to permit the ring to directly contact the shaft; and a lead permanently affixed to the ring for connecting the ring to a control circuit to determine if the ring has contacted the shaft through changes in the electrical properties of the ring.

5. A bearing failure detector as recited in claim 4, comprising in addition auxiliary bearings for supporting the shaft when the shaft contacts the ring.

* * * * *

UNITED STATES PATENT AND TRADEMARK OFFICE
CERTIFICATE OF CORRECTION

PATENT NO. : 5,602,437
DATED : February 11, 1997
INVENTOR(S) : Mohammad Shahamat et al It is certified that error appears in the above-indentified patent and that said Letters Patent is hereby corrected as shown below:

On the title page: Item [54] and Column 1, line 2,

In the title, "ELECTRIC" should be —ELECTRICAL—.

Signed and Sealed this

Twenty-seventh Day of May, 1997

Attest:

BRUCE LEHMAN

Attesting Officer

Commissioner of Patents and Trademarks